United States Patent [19]

Neri

[11] Patent Number: 5,328,322

[45] Date of Patent: Jul. 12, 1994

[54] METHOD AND DEVICE FOR LOADING STACKS OF SHEET MATERIAL INTO A PACKAGING MACHINE FEEDING UNIT

[75] Inventor: Armando Neri, Bologna, Italy

[73] Assignee: G.D. S.p.A., Bologna, Italy

[21] Appl. No.: 4,769

[22] Filed: Jan. 13, 1993

Related U.S. Application Data

[63] Continuation of Ser. No. 701,892, May 17, 1991, abandoned.

[30] Foreign Application Priority Data

May 28, 1990 [IT] Italy .................................. 3523 A/90

[51] Int. Cl.⁵ ............................................. B65G 61/00
[52] U.S. Cl. ................... 414/786; 414/796.9;
         414/927; 414/929; 414/608; 414/923
[58] Field of Search ............... 414/923, 927, 929, 799,
         414/795.4, 795.8, 234, 235, 236, 256, 240, 739,
         267, 286, 796.9, 797, 786, 608, 797.1, 607, 796.2,
         796, 796.7

[56] References Cited

U.S. PATENT DOCUMENTS

| | | | |
|---|---|---|---|
| 548,056 | 10/1895 | Hewitt | 414/929 X |
| 2,792,950 | 5/1957 | Fenton et al. | 414/929 X |
| 3,125,235 | 3/1964 | Frangos | 414/239 |
| 3,294,260 | 12/1966 | Frangos | 414/256 X |
| 3,718,267 | 2/1973 | Hiebert et al. | 414/927 X |
| 3,844,427 | 10/1974 | Miles-Luscombe et al. | 414/795.4 X |
| 3,946,880 | 3/1976 | Shmitt | 414/795.4 X |
| 4,293,264 | 10/1981 | Gilts et al. | 414/923 X |
| 4,358,236 | 11/1982 | Dudley | 414/929 X |
| 4,541,762 | 9/1985 | Tischler et al. | 414/796.9 X |
| 4,639,181 | 1/1987 | Tsubouchi | 414/349 |
| 4,658,715 | 4/1987 | Stobb | 414/927 X |
| 4,998,856 | 3/1991 | LaBarre | 414/240 |
| 5,074,745 | 12/1991 | Neri | 414/929 X |

FOREIGN PATENT DOCUMENTS

| | | | |
|---|---|---|---|
| 0075531 | 3/1983 | European Pat. Off. | |
| 354873 | 2/1990 | European Pat. Off. | 414/929 |
| 3443378 | 6/1985 | Fed. Rep. of Germany | 414/608 |
| 2587311 | 3/1987 | France | 414/927 |
| 273243 | 12/1986 | Japan | 414/929 |
| 191313 | 8/1987 | Japan | 414/929 |
| 208453 | 8/1988 | Japan | 414/929 |
| 2148260 | 5/1985 | United Kingdom . | |

Primary Examiner—Frank E. Werner
Attorney, Agent, or Firm—Guido Modiano; Albert Josif; Daniel O'Byrne

[57] ABSTRACT

Method for loading stacks of sheet material into a packaging machine feeding unit, including the transfer of pallets for carrying the stacks of sheet material onto supporting plates, which are rotatably mounted on a fixed frame of the feeding unit and which are arranged in a raised receiving position; the actuation of the supporting plates, at the end of the step of feeding the stacks onto the unit, from the raised receiving position to a lowered position for releasing the emptied pallets into an underlying removal station; and the return of the supporting plates to the raised receiving position. The device for loading stacks of sheet material into a packaging machine feeding unit includes supporting plates for supporting pallets for carrying the stacks of sheet material. The supporting means are rotatably mounted on a fixed frame of the feeding unit and are suitable for being actuated between a raised position for receiving the pallets bearing the stacks and a lowered position for releasing the emptied pallets into an underlying removal station.

3 Claims, 1 Drawing Sheet

METHOD AND DEVICE FOR LOADING STACKS OF SHEET MATERIAL INTO A PACKAGING MACHINE FEEDING UNIT

This is a continuation application of application Ser. No. 07/701,892 filed on May 17, 1991, now abandoned.

BACKGROUND OF THE INVENTION

The present invention relates to a method and a device for loading stacks of sheet material into a packaging machine feeding unit.

In particular, the present invention relates to a method and a device for loading stacks of cardboard cutouts for rigid cigarette packets into a unit of the above type.

It is known that cigarette packaging machines are fed with stacks of cardboard cutouts intended to constitute the outer container of the packets.

A known unit for feeding packaging machines with stacks of sheet material provides an assembly for removing and transferring said stacks, which are arranged side by side on pallet-like carrier plates; the removal and transfer assembly is provided with a head equipped with elements for gripping a stack and can move vertically and horizontally, so as to arrange itself at the individual stacks and subsequently move up to a station for feeding the sheet material to the packaging machine.

The pallet loading and unloading operations are generally performed by plates of conventional lift trucks with fork elements which are inserted beneath said pallets.

Said loading and unloading operations currently performed require a considerable expenditure of time and labor, since the trucks must perform various movements between the areas where the loaded pallets are stored and those where the unloaded pallets are accumulated. This also prevents the automation of these operations.

SUMMARY OF THE INVENTION

The aim of the present invention is to solve the above problem by plates of a method for loading in a simple and rational manner the stacks of cardboard cutouts into a feeding unit of a packaging machine.

A further object of the present invention is to provide a device for loading stacks of sheet material which is conceptually simple, safely reliable in operation and versatile in use.

According to the present invention, a method and device are provided for loading stacks of sheet material into a packaging machine feeding unit. The method is characterized in that it comprises the transfer of pallet means for carrying the stacks of sheet material onto supporting means, which are rotatably mounted on a fixed frame of the unit for feeding packaging machines and are arranged in a raised receiving position; the actuation of said supporting means, at the end of the step of feeding said stacks onto said unit, from said raised receiving position to a lowered position for releasing the emptied carrying plates at an underlying removal station; and the return of said supporting plates to said raised receiving position.

BRIEF DESCRIPTION OF THE DRAWINGS

The invention is now described with reference to the accompanying drawing, which illustrates a non-limiting embodiment thereof, wherein.

DESCRIPTION OF THE PREFERRED EMBODIMENTS

Figure 2:
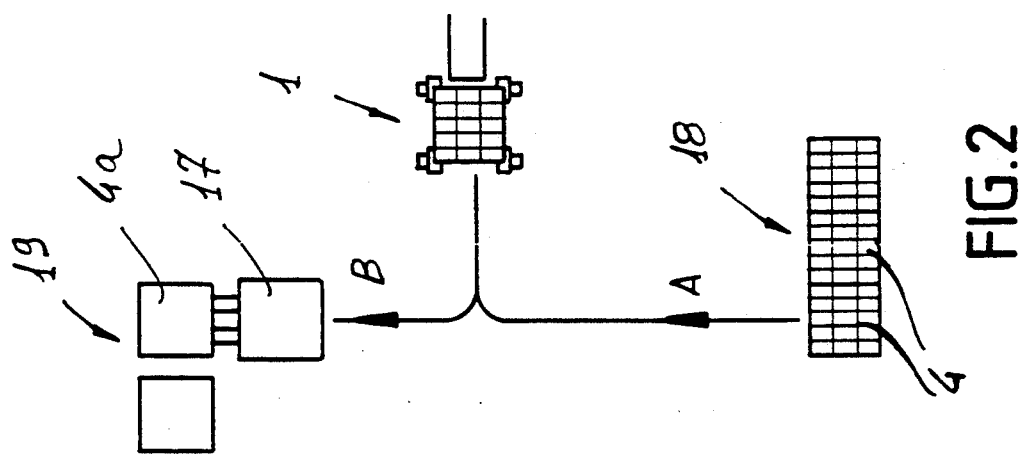
FIG. 2 is a schematic plan view of the loading steps of an operative cycle.
Figure 1:
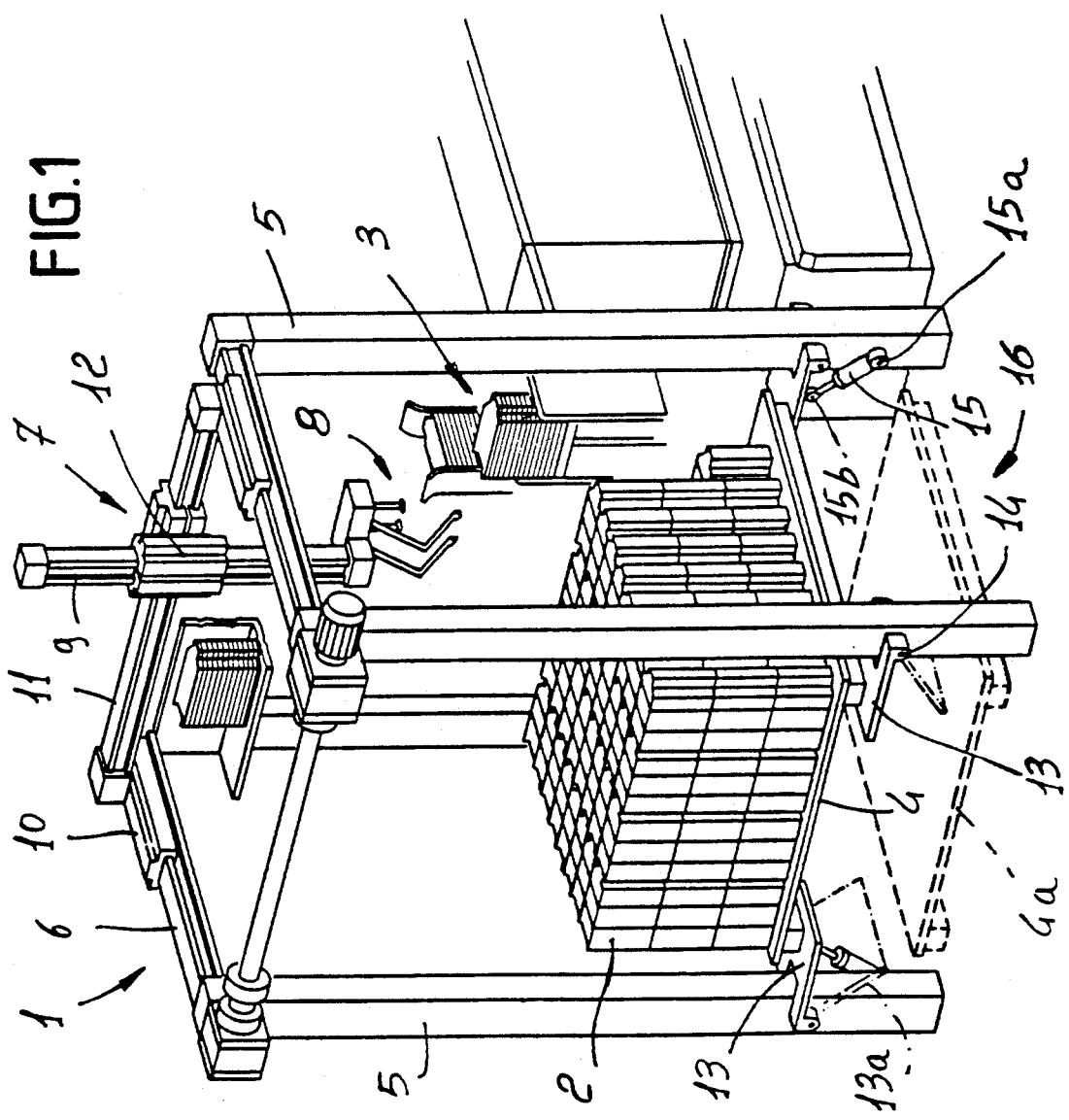
FIG. 1 is a perspective view of a packaging machine feeding unit, provided with the loading device according to the present invention.

With reference to the above figures, the reference numeral 1 generally indicates a feeding unit for automatically feeding stacks 2 of sheet material, made up by cardboard cutouts, to a feeding station 3 for feeding said cutouts to a known packaging or packet-making machine.

The stacks 2 of cutouts to be transferred to the packaging machine are arranged in an orderly fashion on pallet-like carrying plates 4. More particularly, said stacks 2 are arranged mutually side by side along their longitudinal sides, so as to form parallel rows, and said rows are in turn mutually adjacent along the shorter sides of the stacks 2. The stacks are furthermore arranged so as to form superimposed planes or layers.

The unit 1 has a fixed frame which is formed by two pairs of uprights 5 which have, at their top, a pair of beams 6 which are arranged horizontally parallel. An assembly for removing and transferring the stacks 2, generally indicated by the reference numeral 7, can move horizontally along the beams 6.

The removal and transfer assembly 7 has elements 8 for gripping the stacks 2 mounted at the lower end of a vertical beam 9. The beams 6 slidingly support respective sliders 10 which are mutually connected by a cross-member 11 and which can be actuated by plates of appropriate actuation elements; the cross-member 11 slidingly supports a sleeve 12 on which the vertical beam 9 is slidingly mounted.

In their lower part the uprights 5 of the unit 1 rotatably bear respective plates 13 for supporting the pallet define an elevated receiving station and 4. Said supporting plates 13 comprises plates which are articulated to the uprights 5 along horizontal axes 14 which are parallel to the overlying beams 6.

The supporting plates 13 are suitable for being actuated by respective actuation elements 15. Said actuation elements 15 are pivoted, at one end 15a, to a side of the respective upright 5, below the axis 14 of the supporting plates 13, whereas they are articulated, at the other end 15b, below the related supporting plate 13.

The supporting plates 13 can rotate between a raised position for receiving the pallet 4, in which they are arranged on a horizontal plane, and a lowered position, indicated by the broken lines 13a, for releasing the emptied pallet to an underlying removal station 16.

The pallet 4 on which the stacks 2 of cutouts to be transferred to the packaging machine are arranged is removed by means of a conventional lift truck 17 from a remote storage unit 18 in which the pallets to be loaded are arranged in an orderly fashion. The truck 17 transfers the removed pallet 4 to the unit 1, as indicated by the arrow A in FIG. 2, and deposits it on the supporting plates 13, which are preset in the raised receiving position.

From the foregoing it will be understood that the pallet 4 is directly deposited on the releasable supporting plates 13.

In this position, the pallet 4 is below the removal and transfer assembly 7, which can move along the beams 6 of the unit 1. In particular, the grip elements 8 are suitable for being moved along three orthogonal axes, and can therefore be positioned exactly on the stacks 2 to be transferred successively or in sequence to the feeding station 3.

At the beginning, i.e. during the starting operative cycle, at the end of the step of feeding the stacks 2, i.e. when the filled or loaded pallet 4 is completely emptied the plates 13 which support the pallet 4 are actuated by the actuation elements 15 so as to reach the lowered position 13a for releasing the emptied pallet 4a. The released emptied pallet 4a is thereby caused to freely fall selectively onto the underlying removal station 16, since during the starting operative cycle the removal station 16 is empty at that time then falls by gravity.

The return of the plates 13 to the raised position for receiving a subsequent loaded pallet is then actuated. In a subsequently repeated operative cycle, after transferring the loaded pallet 4 onto the supporting plates 13, the truck 17 removes the emptied pallet 4a of the previous operative cycle from the underlying removal station 16. The emptied pallet 4a is then conveyed to a remote accumulation area 19, as indicated by the arrow B in FIG. 2.

It will be understood, in fact, that, in operation, the emptied pallet 4a left from a previous operative cycle is present on the underlying removal station 16, at the time when the filled pallet 4 of the subsequent cycle is transferred on to the supporting plates 13. Moreover, it is evident that, in order to remove the said emptied pallet 4a left there from the previous cycle, the truck 17 has first to abandon the filled pallet 4 and than to remove the underlying emptied pallet. It will be further understood that, while the truck 17 performs the above operations the filled pallet 4, as already mentioned, is supported on the plates 13 independently from the truck 17 so that the transfer assembly 7 feeds in sequence the stacks 2 to the feeding station while the truck is free to perform the above operations.

To summarize, by the described method and device are accomplished in a simple and rational manner, all of the operations for loading and unloading the pallets into the unit which feeds the stacks of sheet material to the packaging machine.

The fact should be stressed that the method according to the invention also allows the automation said pallet loading and unloading operations by means of appropriately robotized trucks. In the practical embodiment of the present invention, the materials employed, as well as the shapes and dimensions, can vary according to the requirements.

I claim:

1. Method for feeding stacks of sheet material to a packaging machine having a feeding station and a feeding unit near said feeding station, wherein the method comprises operative cycles each including the steps of;
    a) transferring a filled first pallet means, filled with said stacks of sheet material, from a storage unit, at a remote distance from said feeding unit, to an elevated receiving station of said feeding unit and supporting said first pallet means on retractable support means in said elevated receiving station;
    b) successively transferring individual stacks of sheet material from said filled first pallet means in said elevated receiving station to said feeding station;
    c) during said step of successive transferring of individual stacks to said feeding station, transferring an empty pallet means present on a removal station of said feeding unit located below said elevated receiving station, to an accumulation station;
    d) when said filled first pallet means is completely emptied by said step of successively transferring said individual stacks to said feeding station, thereby to become an emptied first pallet means, retracting said retractable support means, thereby causing said emptied first pallet means to freely fall selectively from said elevated receiving station of said feeding unit onto said removal station and
    e) repeating the above recited operative cycle.

2. Method for feeding stacks of sheet material to a packaging machine having a feeding station and a feeding unit near said feeding station, wherein the method comprises operative cycles, each including the steps of;
    a) transferring, with a lift truck means, a filled first pallet means, filled with said stacks of sheet material, from a storage unit at a remote distance from said feeding unit towards a fixed frame of said packaging machine feeding unit;
    b) causing said filled first pallet means to be directly deposited by said lift truck means on releasable support means in an elevated receiving station of said fixed frame and to be supported in said elevated receiving station independently from said lift truck means;
    c) successively transferring individual stacks of sheet material from said filled first pallet means in said elevated receiving station to said feeding station;
    d) while said stacks are being transferred to said feeding station, transferring, with said lift truck means, an empty pallet means present on a removal station located below said elevated receiving station, to an accumulation station at a remote distance therefrom;
    e) when said filled first pallet means is completely emptied by said step of successively transferring said individual stacks to said feeding station, thereby to become an emptied first pallet means, releasing said support means, thereby causing said emptied first pallet means to freely fall selectively from said elevated receiving station of said fixed frame onto said removal station and
    f) repeating the above recited operative cycle.

3. Method for feeding stacks of sheet material to a packaging machine having a feeding station and a feeding unit near said feeding station, wherein the method comprises operative cycles, each including the steps of;
    a) transferring, with a lift truck means, a filled first pallet means, filled with said stacks of sheet material, from a remote storage unit towards a fixed frame of said packaging machine feeding unit;
    b) directly depositing, with said lift truck means, said filled first pallet means onto releasable supporting plates defining an elevated receiving station of said fixed frame thereby to support said filled first pallet means independently from said lift truck means, at an elevated position of said fixed frame;
    c) successively transferring individual stacks of sheet material from said filled first pallet means supported on said releasable supporting plates to said feeding station;
    d) while said individual stacks are being successively transferred to said feeding station, transferring, with said lift truck means, an empty pallet means present on a removal station located below said elevated receiving station, to a remote accumulation station;

e) when said filled first pallet means is completely emptied by said step of successively transferring said individual stacks to said feeding station, thereby to become an emptied first pallet means, releasing said emptied first pallet means from said releasable supporting means in said elevated receiving station of said fixed frame and causing said emptied first pallet means to freely fall selectively from said elevated receiving station onto said removal station and f) repeating the above recited operative cycle.

* * * * *